United States Patent
Lu et al.

(10) Patent No.: US 11,949,591 B2
(45) Date of Patent: Apr. 2, 2024

(54) METHOD AND NETWORK NODE FOR LABEL SWITCHED PATH TRACEROUTE

(71) Applicant: Telefonaktiebolaget LM Ericsson (publ), Stockholm (SE)

(72) Inventors: Ying Lu, Beijing (CN); Shuo Yang, Beijing (CN); Wei Sun, Beijing (CN); Jinfeng Zhao, Beijing (CN); Yun Lin, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 37 days.

(21) Appl. No.: 17/636,137

(22) PCT Filed: Sep. 9, 2019

(86) PCT No.: PCT/CN2019/104958
§ 371 (c)(1),
(2) Date: Feb. 17, 2022

(87) PCT Pub. No.: WO2021/046689
PCT Pub. Date: Mar. 18, 2021

(65) Prior Publication Data
US 2022/0294731 A1 Sep. 15, 2022

(51) Int. Cl.
*H04L 45/50* (2022.01)
*H04L 43/10* (2022.01)
(Continued)

(52) U.S. Cl.
CPC .............. *H04L 45/50* (2013.01); *H04L 43/10* (2013.01); *H04L 45/20* (2013.01); *H04L 45/42* (2013.01); *H04L 45/566* (2013.01)

(58) Field of Classification Search
None
See application file for complete search history.

(56) References Cited

U.S. PATENT DOCUMENTS

| | | | |
|---|---|---|---|
| 8,472,346 B1* | 6/2013 | Bahadur | H04L 45/28 370/254 |
| 2004/0165601 A1* | 8/2004 | Liu | H04L 49/30 370/401 |

(Continued)

FOREIGN PATENT DOCUMENTS

| | | |
|---|---|---|
| CN | 101656663 A | 2/2010 |
| CN | 105933229 A | 9/2016 |

(Continued)

OTHER PUBLICATIONS

Nainar, N., et al., "Segment Routing Generic TLV for MPLS Label Switched Path (LSP) Ping/ Trace route", Network Work group, Internet-Draft, Intended status: Standards Track, Jul. 8, 2019, pp. 1-10.

(Continued)

*Primary Examiner* — Joshua Joo
(74) *Attorney, Agent, or Firm* — Murphy, Bilak & Homiller, PLLC (57) ABSTRACT

The present disclosure provides a method (100) in a network node advertising a Binding Segment Identifier, BSID. The method (100) includes: receiving (110) a first echo request packet containing a first target Forwarding Equivalence Class, FEC, stack including an FEC associated with the BSID; and transmitting (120), in response to a Time To Live, TTL, expiration associated with the first echo request packet, a first echo reply packet to an initiating network node initiating the first echo request packet, the first echo reply packet containing an indicator indicating that the FEC is to be replaced by a set of FECs.

16 Claims, 4 Drawing Sheets

(51) Int. Cl.
*H04L 45/00* (2022.01)
*H04L 45/42* (2022.01)

(56) References Cited

U.S. PATENT DOCUMENTS

| | | | | |
|---|---|---|---|---|
| 2006/0198321 | A1* | 9/2006 | Nadeau | H04L 45/50 370/254 |
| 2015/0030026 | A1* | 1/2015 | Kumar | H04L 45/02 370/392 |
| 2016/0254994 | A1 | 9/2016 | Bryant et al. | |
| 2017/0244621 | A1* | 8/2017 | Kompella | H04L 43/10 |
| 2018/0026880 | A1 | 1/2018 | Nainar et al. | |
| 2018/0262425 | A1 | 9/2018 | Sitaraman et al. | |
| 2018/0351863 | A1 | 12/2018 | Vairvakkalai et al. | |
| 2019/0190818 | A1 | 6/2019 | Ceccarelli et al. | |
| 2020/0351197 | A1 | 11/2020 | Zhan et al. | |
| 2020/0382416 | A1* | 12/2020 | Hu | H04L 45/748 |
| 2021/0014146 | A1* | 1/2021 | Chen | H04L 67/56 |
| 2021/0014163 | A1 | 1/2021 | Sitaraman | H04L 43/12 |
| 2021/0111995 | A1* | 4/2021 | Arora | H04L 45/20 |
| 2021/0250270 | A1* | 8/2021 | Arora | H04L 45/50 |

FOREIGN PATENT DOCUMENTS

| | | |
|---|---|---|
| CN | 108574633 A | 9/2018 |
| CN | 108989212 A | 12/2018 |
| CN | 109587009 A | 4/2019 |
| IN | 110061920 A | 7/2019 |
| WO | 2015192501 A1 | 12/2015 |
| WO | 2019005935 A1 | 1/2019 |
| WO | 2019007390 A1 | 1/2019 |

OTHER PUBLICATIONS

"Label Switched Path (LSP) Ping/Traceroute for Segment Routing (SR) IGP-Prefix and IGP-Adjacency Segment Identifiers (SIDs) with MPLS Data Planes", Internet Engineering Task Force (IETF), Request for Comments: 8287, Category: Standards Track, ISSN: 2070-1721, Dec. 2017, pp. 1-29.

Agarwal, P., et al., "Time To Live (TTL) Processing in Multi-Protocol Label Switching (MPLS) Networks", Network Working Group, Request for Comments: 3443, Updates: 3032, Category: Standards Track, Jan. 2003, pp. 1-10.

Arora, K., et al., "TTL Procedures for SR-TE Paths in Label Switched Path Traceroute Mechanism", Routing area, Internet-Draft, Intended status: Standards Track, Juniper Networks Inc., Feb. 21, 2019, pp. 1-12.

Kompella, K., et al., "Detecting Multiprotocol Label Switched (MPLS) Data-Plane Failures", Internet Engineering Task Force (IETF), Request for Comments: 8029, Juniper Networks, Inc., Category: Standards Track, ISSN: 2070-1721, Mar. 2017, pp. 1-88.

Sivabalan, S., et al., "Carrying Binding Label/Segment-ID in PCE-based Networks", PCE Working Group, Internet-Draft, Intended status: Standards Track, Feb. 5, 2019, pp. 1-15.

\* cited by examiner

Fig. 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Operation Type | Address Type  | FEC-tlv length|  Reserved   |B|
+-+-+-+-+-+-+-+-+-+-+-+-+-+-+-+-+-+-+-+-+-+-+-+-+-+-+-+-+-+-+-+-+
|          Remote Peer Address (0, 4, or 16 octets)            |
+-+-+-+-+-+-+-+-+-+-+-+-+-+-+-+-+-+-+-+-+-+-+-+-+-+-+-+-+-+-+-+-+
.                                                              .
.                          FEC TLV                             .
.                                                              .
+-+-+-+-+-+-+-+-+-+-+-+-+-+-+-+-+-+-+-+-+-+-+-+-+-+-+-+-+-+-+-+-+
```

METHOD AND NETWORK NODE FOR LABEL SWITCHED PATH TRACEROUTE

TECHNICAL FIELD

The present disclosure relates to communication technology, and more particularly, to a method and a network node for Label Switched Path (LSP) traceroute.

BACKGROUND

Currently, Segment Routing (SR) LSPs are used with Software Defined Networking (SDN) to enable network programming of Traffic Engineering (TE) paths. An SR-TE LSP is set up by encoding an ordered list of segments in a packet header at a network node (e.g., a Label Switching Router, or LSR) to steer a traffic flow. A Binding Segment (BS) can be used in an SR-TE LSP to provide scaling, network opacity and service independence.

Request For Comments (RFC) 8029, Detecting Multi-Protocol Label Switching (MPLS) Data-Plane Failures, which is incorporated here by reference in its entirety, discloses an LSP traceroute mechanism for testing MPLS LSPs. In RFC 8029, an "MPLS echo request" and an "MPLS echo reply" are defined and Time-To-Live (TTL) values in the header of the MPLS echo request are controlled by an initiating node for hop-by-hop fault localization.

RFC 8287, Label Switched Path (LSP) Ping/Traceroute for Segment Routing (SR) IGP-Prefix and IGP-Adjacency Segment Identifiers (SIDs) with MPLS Data Planes, which is incorporated here by reference in its entirety, defines traceroute as a diagnostic tool for on-demand checking of failures in an SR-based LSP.

Internet Draft, draft-arora-mpls-spring-ttl-procedure-srte-paths-01, TTL Procedures for SR-TE Paths in Label Switched Path Traceroute Mechanisms, K. Arora, et al., February 2019, which is incorporated here by reference in its entirety, proposes a mechanism to perform LSP traceroute for a Binding SID (BSID) within an MPLS data plane. According to this Internet Draft, when a network node advertising a BSID is operating in a uniform model (referring to RFC 3443, TTL Processing in MPLS Networks, which is incorporated here by reference in its entirety), it should send a Forwarding Equivalence Class (FEC) stack change sub-Type-Length-Value (TLV), in order to trace network nodes in an LSP (or referred to as "tunnel") represented by the BSID. On the other hand, when a network node advertising a BSID is operating in a short pipe model (referring to RFC 3443), it should not send an FEC stack change sub-TLV, and the BSID is treated as a single hop and network nodes in an LSP represented by the BSID are not traced.

However, it is desired to trace network nodes in an LSP represented by a BSID in a hop-by-hop manner using the traceroute mechanism, especially in the short pipe model, e.g., when a network node advertising the BSID and a network node initiating the traceroute are in a same administrative domain.

SUMMARY

It is an object of the present disclosure to provide a method and a network node for LSP traceroute, capable of tracing network nodes in an LSP represented by a BSID in a hop-by-hop manner, especially in the short pipe model.

According to a first aspect of the present disclosure, a method in a network node advertising a BSID is provided. The method includes: receiving a first echo request packet containing a first target FEC stack including an FEC associated with the BSID; and transmitting, in response to a TTL expiration associated with the first echo request packet, a first echo reply packet to an initiating network node initiating the first echo request packet. The first echo reply packet contains an indicator indicating that the FEC is to be replaced by a set of FECs.

In an embodiment, the indicator may be included in an FEC stack change sub-TLV in a Downstream Detailed Mapping TLV.

In an embodiment, the method may further include: receiving a second echo request packet containing a second label stack and a second target FEC stack, the second label stack including a label corresponding to the BSID and the second target FEC stack including at least a first FEC from the set of FECs; and transmitting, in response to detecting a TTL expiration associated with the second echo request packet, to a downstream network node a third echo request packet based on the second echo request packet. The third echo request packet contains a third label stack associated with the set of FECs and a third target FEC stack including the first FEC.

In an embodiment, a TTL value associated with at least one label in the third label stack may be configured such that a TTL expiration associated with the third echo request packet is to occur at a network node to be traced by the third echo request packet. The network node to be traced by the third echo request packet may be a network node associated with the first FEC or a network node upstream to the network node associated with the first FEC.

In an embodiment, the second echo request packet may contain a value indicating a number of hops from the network node advertising the BSID to the network node to be traced by the third echo request packet, along an LSP represented by the BSID, and the TTL value associated with the at least one label in the third label stack may be configured based on the value.

In an embodiment, the value may be carried in a TTL value associated with the BSID in the second label stack.

In an embodiment, the TTL value associated with the at least one label in the third label stack may be configured based further on a number of hops from the network node advertising the BSID or from a network node associated with a label that is immediately outer than the label associated with the first FEC in the third label stack to the network node associated with the first FEC.

In an embodiment, the method may further include: receiving a third echo reply packet from the network node to be traced by the third echo request packet; determining that the third echo reply packet is responsive to the third echo request packet; and transmitting to the initiating network node a second echo reply packet responsive to the second echo request packet. The second echo reply packet is based on the third echo reply packet.

In an embodiment, the second echo request packet may contain a first identifier of a traceroute instance initiated by the initiating network node, the third echo request packet may contain a second identifier mapped to the first identifier, the third echo reply packet may be determined to be responsive to the third echo request packet when the third echo reply packet contains an identifier consistent with the second identifier, and the second echo reply packet may be transmitted with an identifier consistent with the first identifier.

In an embodiment, the second echo request packet may contain an Internet Protocol (IP) address of the initiating network node as a source IP address, the third echo request packet may contain an IP address of the network node as a source IP address, and the second echo reply packet may be transmitted using the IP address of the initiating network node as a destination IP address.

According to a second aspect of the present disclosure, a method in a network node initiating an LSP traceroute is provided. The method includes: receiving, from a network node advertising a BSID, a first echo reply packet responsive to a first echo request packet. The first echo request packet contains a first target FEC stack including an FEC associated with the BSID, and the first echo reply packet contains an indicator indicating that the FEC is to be replaced by a set of FECs. The method further includes: transmitting a second echo request packet containing a second target FEC stack based on the set of FECs. The second echo request packet further contains a value indicating a number of hops from the network node advertising the BSID to a network node to be traced by the second echo request packet, along an LSP represented by the BSID.

In an embodiment, the value may be carried in a TTL value associated with the BSID in a label stack in the second echo request packet.

In an embodiment, the method may further include: configuring a TTL value associated with at least one label outer than a label corresponding to the BSID in the label stack, such that a TTL expiration associated with the second echo request packet is to occur at the network node advertising the BSID.

In an embodiment, the operation of configuring may include: adding an explicit-NULL label associated with a TTL value of 1 as a label immediately outer than the label corresponding to the BSID in the label stack.

In an embodiment, the operation of adding may be performed in response to determining that each of one or more labels outer than the label corresponding to the BSID in the label stack will have been popped when the second echo request is received by the network node advertising the BSID.

In an embodiment, the operation of determining that each of the one or more labels outer than the label corresponding to the BSID in the label stack will have been popped when the second echo request is received by the network node advertising the BSID may include determining that a label immediately outer than the BSID in the label stack is associated with an adjacency SID or a Penultimate Hop Popping (PHP) enabled node SID of the network node advertising the BSID.

In an embodiment, the method may further include: receiving a second echo reply packet responsive to the second echo request packet from the network node advertising the BSID; and transmitting a further echo request packet containing a further value indicating a number of hops from the network node advertising the BSID to a next network node to be traced along the LSP represented by the BSID.

According to a third aspect of the present disclosure, a network node is provided. The network node includes a communication interface, a processor and a memory. The memory stores instructions executable by the processor whereby the network node is operative to perform the method according to any of the above first or second aspect.

According to a fourth aspect of the present disclosure, a computer readable storage medium is provided. The computer readable storage medium has computer program instructions stored thereon. The computer program instructions, when executed by a processor in a network node, cause the network node to perform the method according to any of the above first or second aspect.

With the embodiments of the present disclosure, when a network node advertising a BSID receives an echo request packet containing a target FEC stack including an FEC associated with the BSID, it can transmit, in response to a TTL expiration associated with the echo request packet, an echo reply packet to an initiating network node initiating the echo request packet. The echo reply packet can contain an indicator indicating that the FEC is to be replaced by a set of FECs. Upon receiving the echo reply packet containing the indicator, the initiating network node can transmit further echo request packets each containing a target FEC stack based on the set of FECs, for hop-by-hop traceroute of network nodes along an LSP represented by the BSID. Upon receiving each of the further echo request packets, the network node advertising the BSID can act as a proxy that transmits an echo request packet along the LSP, receives an echo reply packet from a network node in the LSP and forwards the echo reply packet to the initiating network node. In this way, the initiator network node can trace the network nodes in the LSP in a hop-by-hop manner.

BRIEF DESCRIPTION OF THE DRAWINGS

The above and other objects, features and advantages will be more apparent from the following description of embodiments with reference to the figures, in which.

DETAILED DESCRIPTION

In the following, references in the specification to "one embodiment", "an embodiment", "an example embodiment" and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or"

includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 1:
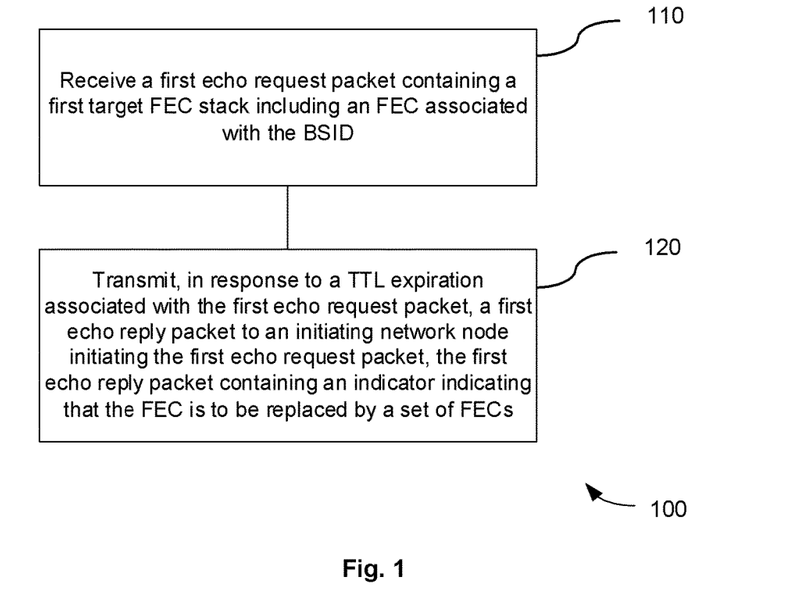
FIG. 1 is a flowchart illustrating a method for LSP traceroute according to an embodiment of the present disclosure.

FIG. 1 is a flowchart illustrating a method 100 for LSP traceroute according to an embodiment of the present disclosure. The method 100 can be performed at a network node, e.g., an LSR, advertising a BSID (the network node is referred to as "advertising node" hereinafter for simplicity).

At block 110, a first echo request packet is received. The first echo request packet contains a first target FEC stack including an FEC associated with the BSID.

At block 120, a first echo reply packet is transmitted to an initiating network node initiating the first echo request packet in response to a TTL expiration associated with the first echo request packet. The first echo reply packet contains an indicator indicating that the FEC is to be replaced by a set of FECs.

Here, a TTL expiration means that a TTL value associated with an outermost label of a label stack in an echo request packet, or a TTL value associated with a label in the label stack that is to be used for forwarding, becomes zero (0) after decremented by 1.

In the block 120, the indicator can be included in an FEC stack change sub-TLV in a Downstream Detailed Mapping TLV. The FEC stack change sub-TLV is defined in RFC 8029. According to RFC 8029, a network node being traced encodes this sub-TLV in an echo reply when its downstream node has a different FEC stack than the FEC stack received in the echo request. With this information in the echo reply, an initiating network node knows how to manipulate TTL values in the next echo request to properly trace the next network node. This mechanism works well for SR-TE paths using node segments or adjacency segments, but conventionally it does not work properly with binding segments because the initiating network node is not aware of a label stack change due to replacement of a BSID with a set of SIDs at a remote advertising node of the BSID.

Figure 2:
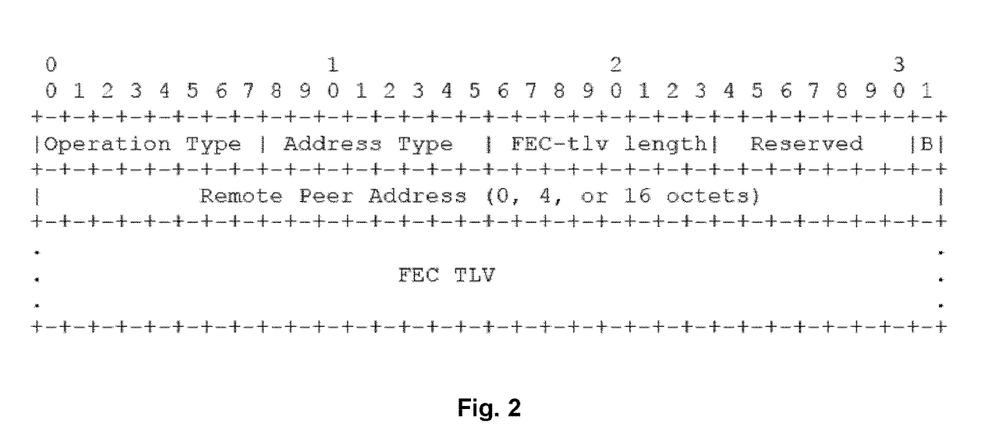
FIG. 2 is a schematic diagram showing a FEC stack change sub-TLV according to an embodiment of the present disclosure.

FIG. 2 shows an exemplary format of an FEC stack change sub-TLV according to an embodiment of the present disclosure. As shown, a B-bit, i.e., the above indicator, is introduced in the FEC stack change sub-TLV. For example, if an FEC to be popped in the FEC stack change is an FEC associated with a BSID, the B-bit is set; or otherwise it is not set.

The B-bit, once set, informs the initiating network node that the FEC stack change is a result of replacing the FEC associated with BSID by the set of FECs, and that the advertising node is capable of acting as a proxy for tracing the network nodes along an LSP represented by the BSID on behalf of the initiating node.

Accordingly, the advertising node may then receive a second echo request packet initiated from the initiating network node. The second echo request packet contains a second label stack and a second target FEC stack. The second label stack includes a corresponding to the BSID and the second target FEC stack includes at least a first FEC from the set of FECs. In response to detecting a TTL expiration associated with the second echo request packet, the advertising node can transmit to a downstream network node a third echo request packet based on the second echo request packet. The third echo request packet contains a third label stack associated with the set of FECs and a third target FEC stack including the first FEC. In an example, the third target FEC stack may be the same as the second target FEC stack.

In an example, the second echo request packet can contain a first identifier of a traceroute instance initiated by the initiating network node, and the third echo request packet can contain a second identifier mapped to the first identifier. Further, the second echo request packet can contain an IP address of the initiating network node as a source IP address, and the third echo request packet can contain an IP address of the advertising node as a source IP address.

For example, the advertising node can extract a sender's handle (denoted as ini_sh) and a source IP address (denoted as ini_sip) from the second echo request packet, assign a new sender's handle (denoted as new_sh) to be used in the third echo request packet, and maintain a mapping between {ini_sh, ini_sip} and {new_sh}.

Here, a TTL value associated with at least one label in the third label stack can be configured such that a TTL expiration associated with the third echo request packet is to occur at a network node to be traced by the third echo request packet. The network node to be traced by the third echo request packet may be a network node associated with the first FEC or a network node upstream to the network node associated with the first FEC.

In an example, the second echo request packet can contain a value (referred to as a Hop Indicator, or HI, hereinafter) indicating a number of hops from the advertising node to the network node to be traced by the third echo request packet, along an LSP represented by the BSID. For example, the value can be carried in a TTL value associated with the BSID in the second label stack. Accordingly, the TTL value associated with the at least one label in the third label stack can be configured based on the value. Here, the TTL value associated with the at least one label in the third label stack can be configured based further on a number of hops from the advertising node or from a network node associated with a label that is immediately outer than the label associated with the first FEC in the third label stack to the network node associated with the first FEC.

For example, assuming that the third label stack is $\{label_1, label_2, \ldots label_M\}$, where M denotes the number of labels in the third label stack, the advertising node can maintain a local record of $\{nhop_1, nhop_2, \ldots, nhop_M\}$, where $nhop_M$ ($1 \le m \le M$) denotes the number of hops from the node associated with $label_{m-1}$ to the node associated with $label_m$ ($nhop_1$ denotes the number of hops from the advertising node to the node associated with $label_1$). In an example, each of $nhop_1, nhop_2, \ldots, nhop_M$ can be set to zero initially and the TTL value, denoted as $ttl_m$, associated with $label_m$ in the third label stack can be configured as:

$ttl_m = 255$, if $nhop_m \ne 0$, or $ttl_m = hi - \Sigma_{j=1}^{m-1} nhop_j$, if $nhop_m = 0$, where hi is the value of the HI in the second echo request packet.

In an example, except the sender's handle, the source IP address, the label stack and the TTL values associated with the labels in the label stack, the third echo request packet can be substantially the same as the second echo request packet.

Then, the advertising node can receive a third echo reply packet from the network node to be traced by the third echo request packet. The advertising node can determine that the third echo reply packet is responsive to the third echo request packet, e.g., by determining that the third echo reply packet contains an identifier consistent with the second identifier. Next, the advertising node can transmit to the initiating network node a second echo reply packet responsive to the second echo request packet. The second echo reply packet is based on the third echo reply packet. For example, the second echo reply packet can be transmitted using the IP address of the initiating network node as a destination IP address, and can contain an identifier consistent with the first identifier, such that the initiating network node can determine that the second echo reply packet is responsive to the second echo request packet.

For example, with the above mapping between {ini_sh, ini_sip} and {new_sh}, upon receiving the third echo reply packet containing new_sh, the advertising node determines that the third echo reply packet is responsive to the third echo request packet and transmits the second echo reply packet with ini_sh as the identifier and ini_sip as the destination IP address. In an example, except the identifier and the destination IP address, the second echo reply packet can be substantially the same as the third echo reply packet.

In an example, when the third echo reply packet contains an FEC stack change sub-TLV indicating that the replying network node is an egress node of the first FEC with an operation type of POP, the advertising node can update the record of $nhop_m$ (assuming that the replying network node corresponds to $label_m$) based on a TTL value associated with $label_m$ in the third echo request packet.

Alternatively, the advertising node can update the record of $nhop_m$, e.g., by incrementing $nhop_m$ by 1, each time it receives the third echo reply packet. In this case, an egress-flag can be introduced, which is set to FALSE unless the third echo reply packet indicates that the replying network node is an egress node of the first FEC with an operation type of POP. Accordingly, the above TTL value $ttl_m$ can be configured as:

$ttl_m$=255, if egress-flag=TRUE, or $ttl_m=hi-\Sigma_{j=1}^{m-1} hop_j$, if egress-flag=FALSE.

Figure 3:
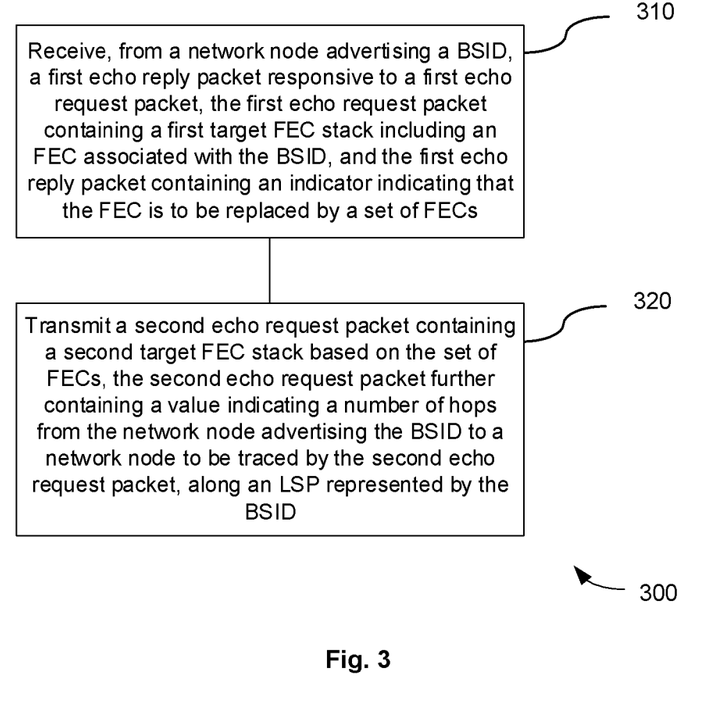
FIG. 3 is a flowchart illustrating a method for LSP traceroute according to another embodiment of the present disclosure.

FIG. 3 is a flowchart illustrating a method 300 for LSP traceroute according to an embodiment of the present disclosure. The method 300 can be performed at a network node, e.g., an LSR, initiating an LSP traceroute.

At block 310, a first echo reply packet responsive to a first echo request packet is received from a network node advertising a BSID (the network node is referred to as "advertising node" hereinafter). The first echo request packet contains a first target FEC stack including an FEC associated with the BSID. The first echo reply packet contains an indicator indicating that the FEC is to be replaced by a set of FECs. In an example, the indicator can be the B-bit as shown in FIG. 2.

At block 320, a second echo request packet is transmitted. The second echo request packet contains a second target FEC stack based on the set of FECs. The second echo request packet further contains a value indicating a number of hops from the advertising node to a network node to be traced by the second echo request packet, along an LSP represented by the BSID. In an example, the value can be carried in a TTL value associated with the BSID in a label stack in the second echo request packet.

In an example, a TTL value associated with at least one label outer than a label corresponding to the BSID in the label stack can be configured such that a TTL expiration associated with the second echo request packet is to occur at the advertising node. For example, an explicit-NULL label associated with a TTL value of 1 can be added as a label immediately outer than the label corresponding to the BSID in the label stack. The explicit-NULL label can be added in response to determining that each of one or more labels outer than the label corresponding to the BSID in the label stack will have been popped when the second echo request is received by the advertising node, e.g., in response to determining that a label immediately outer than the BSID in the label stack is associated with an adjacency SID or a Penultimate Hop Popping (PHP) enabled node SID of the advertising node. Alternatively, the explicit-NULL label can always be added to ensure that the TTL expiration associated with the second echo request packet will occur at the advertising node.

Then, the initiating network node can receive a second echo reply packet responsive to the second echo request packet from the advertising node. Next, the initiating network node can transmit a further echo request packet containing a further value indicating a number of hops from the advertising node to a next network node to be traced along the LSP represented by the BSID. In an example, the further value can be obtained by incrementing the value by 1.

Figure 4:
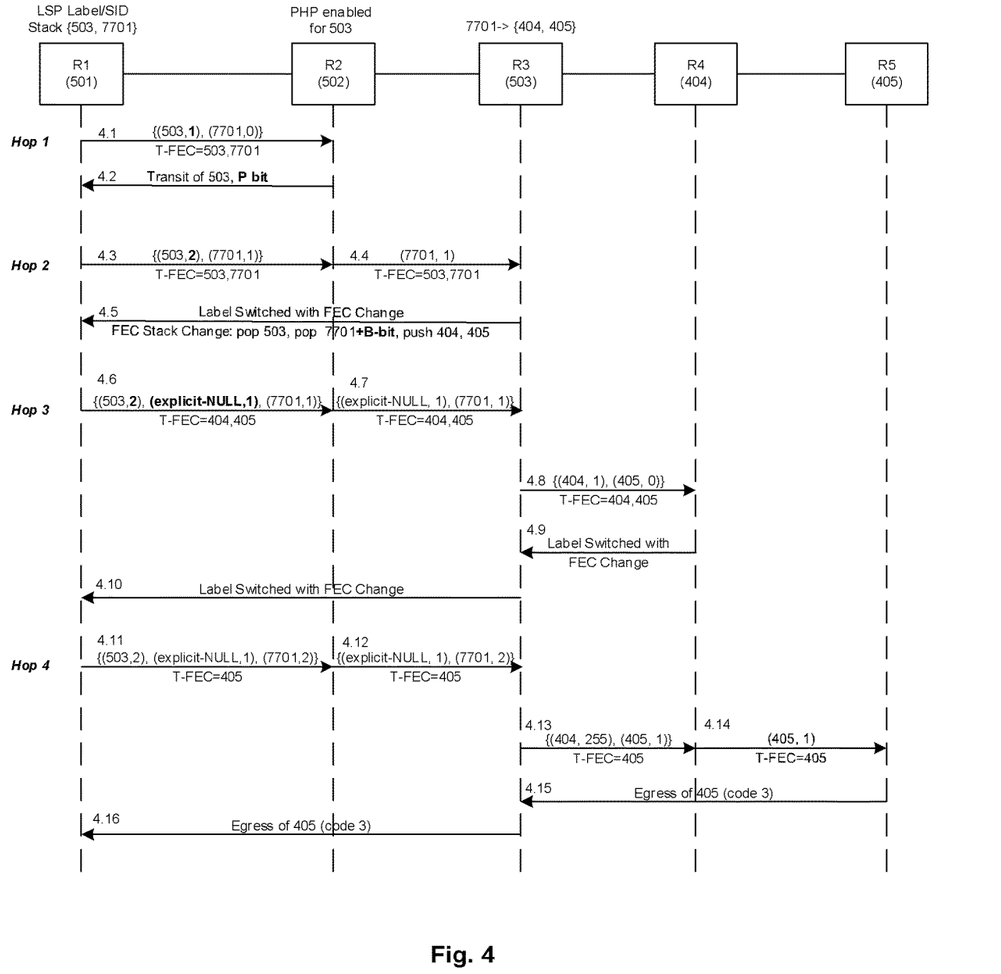
FIG. 4 is a schematic diagram showing an example of LSP traceroute according to the present disclosure.

In the following, the above methods 100 and 300 will be further explained with reference to FIG. 4, which shows an example of LSP traceroute. In this example, five network nodes, e.g., LSRs, R1, R2, R3, R4 and R5, are shown and their respective labels are 501, 502, 503, 504 and 505. Here, for the purpose of simplicity, in the following description, the labels are not distinguished from their corresponding SIDs and associated FECs. For example, R1 has a label 501, and the corresponding SID and the associated FEC are denoted as 501 as well. In this example, R1 is an initiating network node initiating the LSP traceroute and R3 is an advertising node advertising a BSID 7701 that can be replaced with two Node SIDs 404 and 405. In FIG. 4, a notation (x, y) denotes a label x and its associated TTL value of y. It is assumed here that the LSP to be traced is represented as a label stack {503, 7701}.

As shown in FIG. 4, at 4.1, for Hop 1, R1 transmits an echo request having a label stack {(503, 1), (7701, 0)} and a target FEC stack (denoted as T-FEC) of {503, 7701}. R2 receives the echo request and detects a TLL expiration (TTL=1 for the outermost label 503), then validates the outermost FEC and determines that it is a PHP node for the outermost FEC 503. At 4.2, R2 then transmits an echo reply to R1, containing a P-bit indicating PHP enabled for 503 in Downstream Mapping object Flags (DS Flags) in a Downstream Detailed Mapping TLV.

At 4.3, for Hop=2, R1 transmits a next echo request having a label stack {(503, 2), (7701, 1)} and a T-FEC of {503, 7701}. R2 receives the echo request, pops the label 503 as the PHP is enabled, and forwards the echo request to R3 at 4.4. Upon receiving the echo request, R3 detects a TLL expiration (TTL=1 for the outermost label 7701), looks at the outermost FEC 503 and knows that it is the egress node of the outermost FEC. R3 then pops the FEC 503 and continues looking at the next FEC 7701 and knows that it is the advertising node for the BSID 7701, which is to be replaced by a list of Node SIDs {404, 405}. At 4.5, R3 transmits an echo reply to R1, containing a return code 15 (Label Switched with FEC Change) and the following FEC stack change sub-TLVs:

FEC stack change with operation type 'POP' for Node SID 503,
FEC stack change with operation type 'POP' for BSID 7701, with B-bit set,
FEC stack change with operation type 'PUSH' for Node SID 404, and
FEC stack change with operation type 'PUSH' for Node SID 405.

Upon receiving the echo reply, R1 looks at the FEC stack change sub-TLV and finds that the FEC 503 is popped, so it knows that R3 is the egress node for the SID 503. R1 also finds the B-bit associated with the popped FEC 7701, so R1 knows that 7701 is a BSID which can be translated into a list of Node SIDs {404, 405}, and that R3 is the advertising node for the BSID 7701 and is capable of acting as a proxy for tracing network nodes along the LSP represented by {404, 405}. As a result, at 4.6, for Hop 3, R1 transmits a next echo request having a label stack {(503, 2), (explicit-NULL, 1), (7701, 1)} and a T-FEC of {404, 405}, with the TTL value of the label 7701 as an HI (i.e., hi=1). R2 receives the echo request, pops the label 503 as the PHP is enabled, and forwards the echo request to R3 at 4.7. Upon receiving the echo request, R3 detects a TLL expiration (TTL=1 for the outermost label explicit-NULL), and generates a new echo request based on the received echo request and transmits it downstream at 4.8. The new echo request is substantially the same as the received echo request except that it has a label stack {(404, 1), (405, 0)} and contains a new sender's handle as a traceroute instance identifier and an IP address of R3 as its source IP address. Upon receiving the new echo request, R4 detects a TLL expiration (TTL=1 for the outermost label 404), looks at the outermost FEC 404 and knows that it is the egress node for the outermost FEC. At 4.9, R4 transmits an echo reply to R3 (using the IP address of R3 as its destination IP address), containing a return code 15 (Label Switched with FEC Change) and the following FEC stack change sub-TLV:

FEC stack change with operation type 'POP' for Node SID 404.

Upon receiving the echo reply, R3 determines that it is responsive to the echo request transmitted at 4.8, e.g., based on a sender's handle in the echo reply that is consistent with the new sender's handle, and knows that Node SID 404 is popped. Accordingly, R3 updates its local record with {label$_1$=404, nhop$_1$=1}. At 4.10, R3 then transmits an echo reply responsive to the echo request received at 4.6. The echo reply is substantially the same as the echo reply received at 4.9, except that it has an IP address of R1 as its destination IP address.

Upon receiving the echo reply, R1 knows from the FEC stack change sub-TLV that Node SID 404 is popped, and knows from the return code that the egress node of the LSP {503, 7701} has not been reached and it needs to continue the traceroute. At 4.11, for Hop 4, R1 transmits a next echo request having a label stack {(503, 2), (explicit-NULL, 1), (7701, 2)} and a T-FEC of 405, with the TTL value of the label 7701 as an HI (i.e., hi=2). R2 receives the echo request, pops the label 503 as the PHP is enabled, and forwards the echo request to R3 at 4.12. Upon receiving the echo request, R3 detects a TLL expiration (TTL=1 for the outermost label explicit-NULL), and generates a new echo request based on the received echo request and transmits it downstream at 4.13. The new echo request is substantially the same as the received echo request except that it has a label stack {(404, 255), (405, 1)} and contains a new sender's handle as a traceroute instance identifier and an IP address of R3 as its source IP address. Here, the TLL value associated with the label 405 is calculated as: ttl$_2$—hi−nhop$_1$=1. Then, R4 simply pops the label 404 from the label stack and forwards the new echo request downstream at 4.14. Upon receiving the new echo request, R5 detects a TLL expiration (TTL=1 for the outermost label 405), looks at the outermost FEC 405 and knows that it is the egress node for the outermost FEC and that there is no further FEC in the T-FEC. At 4.15, R5 transmits an echo reply to R3 (using the IP address of R3 as its destination IP address), containing a return code 3 (replying router is an egress for the FEC at stack-depth <2>) and the following FEC stack change sub-TLV:

FEC stack change with operation type 'POP' for Node SID 405.

Upon receiving the echo reply, R3 determines that it is responsive to the echo request transmitted at 4.13, e.g., based on a sender's handle in the echo reply that is consistent with the new sender's handle, and knows that Node SID 405 is popped. Accordingly, R3 updates its local record with {label$_2$=405, nhop$_2$=1}. At 4.16, R3 then transmits an echo reply responsive to the echo request received at 4.12. The echo reply is substantially the same as the echo reply received at 4.15, except that it has an IP address of R1 as its destination IP address. Upon receiving the echo reply, R1 knows from the FEC stack change sub-TLV that Node SID 405 is popped, and knows from the return code that the egress node of the LSP {503, 7701} has been reached and the traceroute has completed.

It is to be noted here that, while R4 is the next-hop downstream node of R3 and R5 is the next-hop downstream node of R4 in the example shown in FIG. 4, there may be one or more intermediate nodes between R3 and R4, and/or there may be one or more intermediate nodes between R4 and R5, and the present disclosure applies equally to any of these cases, simply following the rules set forth in RFC 8029.

Figure 5:
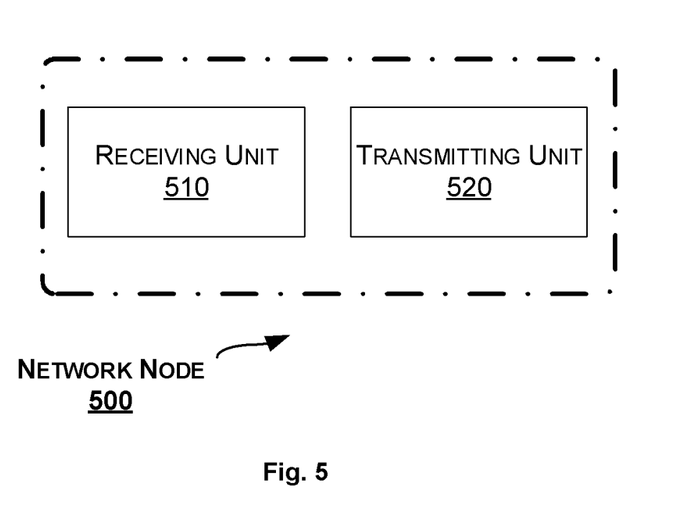
FIG. 5 is a block diagram of a network node according to an embodiment of the present disclosure.

Correspondingly to the methods 100 and/or 300 as described above, a network node is provided. FIG. 5 is a block diagram of a network node 500 according to an embodiment of the present disclosure.

The network node 500 can be a network node, e.g., an LSR, advertising a BSID, and can be configured to perform the method 100 as described above in connection with FIG. 1. As shown in FIG. 5, the network node 500 includes a receiving unit 510 configured to receive a first echo request packet containing a first target FEC stack including an FEC associated with the BSID. The network node 500 further includes a transmitting unit 520 configured to transmit, in response to a TTL expiration associated with the first echo request packet, a first echo reply packet to an initiating network node initiating the first echo request packet. The first echo reply packet contains an indicator indicating that the FEC is to be replaced by a set of FECs.

In an embodiment, the indicator may be included in an FEC stack change sub-TLV in a Downstream Detailed Mapping TLV.

In an embodiment, the receiving unit 510 can be further configured to receive a second echo request packet containing a second label stack and a second target FEC stack, the second label stack including a label corresponding to the BSID and the second target FEC stack including at least a first FEC from the set of FECs. The transmitting unit 520 can be further configured to transmit, in response to detecting a TTL expiration associated with the second echo request packet, to a downstream network node a third echo request packet based on the second echo request packet. The third echo request packet contains a third label stack associated with the set of FECs and a third target FEC stack including the first FEC.

In an embodiment, a TTL value associated with at least one label in the third label stack may be configured such that a TTL expiration associated with the third echo request packet is to occur at a network node to be traced by the third echo request packet. The network node to be traced by the third echo request packet may be a network node associated with the first FEC or a network node upstream to the network node associated with the first FEC.

In an embodiment, the second echo request packet may contain a value indicating a number of hops from the network node advertising the BSID to the network node to be traced by the third echo request packet, along an LSP represented by the BSID, and the TTL value associated with the at least one label in the third label stack may be configured based on the value.

In an embodiment, the value may be carried in a TTL value associated with the BSID in the second label stack.

In an embodiment, the TTL value associated with the at least one label in the third label stack may be configured based further on a number of hops from the network node advertising the BSID or from a network node associated with a label that is immediately outer than the label associated with the first FEC in the third label stack to the network node associated with the first FEC.

In an embodiment, the receiving unit 510 can be further configured to receive a third echo reply packet from the network node to be traced by the third echo request packet. The network node 500 can further include a determining unit configured to determine that the third echo reply packet is responsive to the third echo request packet. The transmitting unit 520 can be further configured to transmit to the initiating network node a second echo reply packet responsive to the second echo request packet. The second echo reply packet is based on the third echo reply packet.

In an embodiment, the second echo request packet may contain a first identifier of a traceroute instance initiated by the initiating network node, the third echo request packet may contain a second identifier mapped to the first identifier, the third echo reply packet may be determined to be responsive to the third echo request packet when the third echo reply packet contains an identifier consistent with the second identifier, and the second echo reply packet may be transmitted with an identifier consistent with the first identifier.

In an embodiment, the second echo request packet may contain an IP address of the initiating network node as a source IP address, the third echo request packet may contain an IP address of the network node as a source IP address, and the second echo reply packet may be transmitted using the IP address of the initiating network node as a destination IP address.

Alternatively, the network node 500 can be a network node, e.g., an LSR, initiating an LSP traceroute, and can be configured to perform the method 300 as described above in connection with FIG. 3. As shown in FIG. 5, the network node 500 includes a receiving unit 510 configured to receive, from a network node advertising a BSID, a first echo reply packet responsive to a first echo request packet. The first echo request packet contains a first target FEC stack including an FEC associated with the BSID, and the first echo reply packet contains an indicator indicating that the FEC is to be replaced by a set of FECs. The network node 500 further includes a transmitting unit 520 configured to transmit a second echo request packet containing a second target FEC stack based on the set of FECs. The second echo request packet further contains a value indicating a number of hops from the network node advertising the BSID to a network node to be traced by the second echo request packet, along an LSP represented by the BSID.

In an embodiment, the value may be carried in a TTL value associated with the BSID in a label stack in the second echo request packet.

In an embodiment, the network node 500 may further include a configuring unit configured to configure a TTL value associated with at least one label outer than a label corresponding to the BSID in the label stack, such that a TTL expiration associated with the second echo request packet is to occur at the network node advertising the BSID.

In an embodiment, the configuring unit may be configured to add an explicit-NULL label associated with a TTL value of 1 as a label immediately outer than the label corresponding to the BSID in the label stack.

In an embodiment, the explicit-NULL label may be added in response to determining that each of one or more labels outer than the label corresponding to the BSID in the label stack will have been popped when the second echo request is received by the network node advertising the BSID.

In an embodiment, the operation of determining that each of the one or more labels outer than the label corresponding to the BSID in the label stack will have been popped when the second echo request is received by the network node advertising the BSID may include determining that a label immediately outer than the BSID in the label stack is associated with an adjacency SID or a Penultimate Hop Popping (PHP) enabled node SID of the network node advertising the BSID.

In an embodiment, the receiving unit 510 can be further configured to receive a second echo reply packet responsive to the second echo request packet from the network node advertising the BSID. The transmitting unit 520 can be further configured to transmit a further echo request packet containing a further value indicating a number of hops from the network node advertising the BSID to a next network node to be traced along the LSP represented by the BSID.

The units 510-520 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1 or 3.

Figure 6:
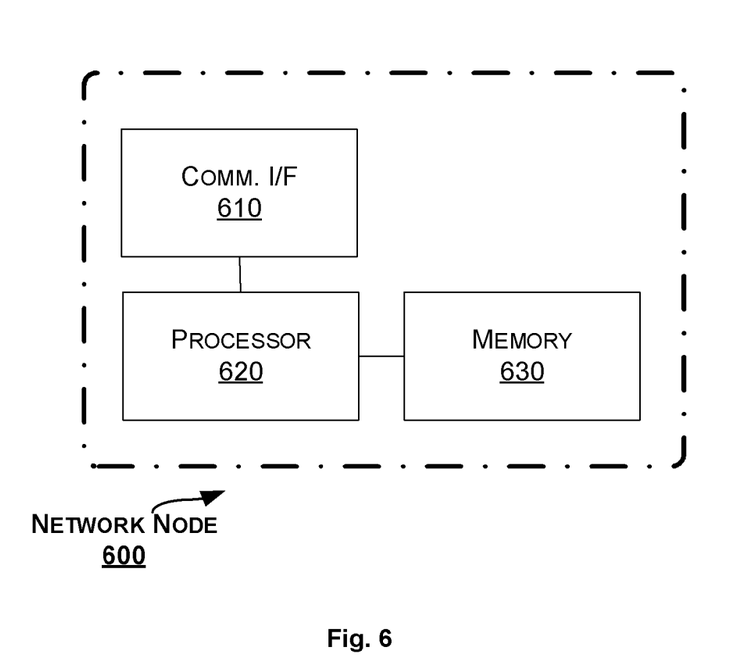
FIG. 6 is a block diagram of a network node according to another embodiment of the present disclosure.

FIG. 6 is a block diagram of a network node 600 according to another embodiment of the present disclosure.

The network node 600 includes a communication interface 610, a processor 620 and a memory 630. The memory 630 contains instructions executable by the processor 620 whereby the network node 600 is operative to perform the actions, e.g., of the procedure described earlier in conjunction with FIG. 1 or 3.

For example, the network node 600 can be a network node, e.g., an LSR, advertising a BSID. Particularly, the memory 630 can contain instructions executable by the processor 620 whereby the network node 600 is operative to: receive a first echo request packet containing a first target FEC stack including an FEC associated with the BSID; and transmit, in response to a TTL expiration associated with the first echo request packet, a first echo reply packet to an initiating network node initiating the first echo request packet. The first echo reply packet contains an indicator indicating that the FEC is to be replaced by a set of FECs.

In an embodiment, the indicator may be included in an FEC stack change sub-TLV in a Downstream Detailed Mapping TLV.

In an embodiment, the memory 630 can further contain instructions executable by the processor 620 whereby the network node 600 is operative to: receive a second echo request packet containing a second label stack and a second target FEC stack, the second label stack including a label corresponding to the BSID and the second target FEC stack including at least a first FEC from the set of FECs; and transmit, in response to detecting a TTL expiration associated with the second echo request packet, to a downstream network node a third echo request packet based on the second echo request packet. The third echo request packet contains a third label stack associated with the set of FECs and a third target FEC stack including the first FEC.

In an embodiment, a TTL value associated with at least one label in the third label stack may be configured such that a TTL expiration associated with the third echo request packet is to occur at a network node to be traced by the third echo request packet. The network node to be traced by the third echo request packet may be a network node associated with the first FEC or a network node upstream to the network node associated with the first FEC.

In an embodiment, the second echo request packet may contain a value indicating a number of hops from the network node advertising the BSID to the network node to be traced by the third echo request packet, along an LSP represented by the BSID, and the TTL value associated with the at least one label in the third label stack may be configured based on the value.

In an embodiment, the value may be carried in a TTL value associated with the BSID in the second label stack.

In an embodiment, the TTL value associated with the at least one label in the third label stack may be configured based further on a number of hops from the network node advertising the BSID or from a network node associated with a label that is immediately outer than the label associated with the first FEC in the third label stack to the network node associated with the first FEC.

In an embodiment, the memory 630 can further contain instructions executable by the processor 620 whereby the network node 600 is operative to: receive a third echo reply packet from the network node to be traced by the third echo request packet; determine that the third echo reply packet is responsive to the third echo request packet; and transmit to the initiating network node a second echo reply packet responsive to the second echo request packet. The second echo reply packet is based on the third echo reply packet.

In an embodiment, the second echo request packet may contain a first identifier of a traceroute instance initiated by the initiating network node, the third echo request packet may contain a second identifier mapped to the first identifier, the third echo reply packet may be determined to be responsive to the third echo request packet when the third echo reply packet contains an identifier consistent with the second identifier, and the second echo reply packet may be transmitted with an identifier consistent with the first identifier.

In an embodiment, the second echo request packet may contain an IP address of the initiating network node as a source IP address, the third echo request packet may contain an IP address of the network node as a source IP address, and the second echo reply packet may be transmitted using the IP address of the initiating network node as a destination IP address.

Alternatively, the network node 600 can be a network node, e.g., an LSR, initiating an LSP traceroute. Particularly, the memory 630 can contain instructions executable by the processor 620 whereby the network node 600 is operative to: receive, from a network node advertising a BSID, a first echo reply packet responsive to a first echo request packet. The first echo request packet contains a first target FEC stack including an FEC associated with the BSID, and the first echo reply packet contains an indicator indicating that the FEC is to be replaced by a set of FECs. The memory 630 contains instructions executable by the processor 620 whereby the network node 600 is operative to: transmit a second echo request packet containing a second target FEC stack based on the set of FECs. The second echo request packet further contains a value indicating a number of hops from the network node advertising the BSID to a network node to be traced by the second echo request packet, along an LSP represented by the BSID.

In an embodiment, the value may be carried in a TTL value associated with the BSID in a label stack in the second echo request packet.

In an embodiment, the memory 630 can further contain instructions executable by the processor 620 whereby the network node 600 is operative to: configure a TTL value associated with at least one label outer than a label corresponding to the BSID in the label stack, such that a TTL expiration associated with the second echo request packet is to occur at the network node advertising the BSID.

In an embodiment, the operation of configuring may include: adding an explicit-NULL label associated with a TTL value of 1 as a label immediately outer than the label corresponding to the BSID in the label stack.

In an embodiment, the operation of adding may be performed in response to determining that each of one or more labels outer than the label corresponding to the BSID in the label stack will have been popped when the second echo request is received by the network node advertising the BSID.

In an embodiment, the operation of determining that each of the one or more labels outer than the label corresponding to the BSID in the label stack will have been popped when the second echo request is received by the network node advertising the BSID may include determining that a label immediately outer than the BSID in the label stack is associated with an adjacency SID or a Penultimate Hop Popping (PHP) enabled node SID of the network node advertising the BSID.

In an embodiment, the memory 630 can further contain instructions executable by the processor 620 whereby the network node 600 is operative to: receive a second echo reply packet responsive to the second echo request packet from the network node advertising the BSID; and transmit a further echo request packet containing a further value indicating a number of hops from the network node advertising the BSID to a next network node to be traced along the LSP represented by the BSID.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 620 causes the network node 600 to perform the actions, e.g., of the procedure described earlier in conjunction with FIG. 1 or 3.

The computer program product may be configured as a computer program code structured in computer program modules. The computer program modules could essentially perform the actions of the flow illustrated in FIG. 1 or 3.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method performed by a network node, the method comprising:
 receiving a first echo request packet containing a first target Forwarding Equivalence Class (FEC) stack that includes an FEC associated with a Binding Segment Identifier (BSID) advertised by the network node;
 in response to expiration of a Time To Live (TTL) associated with the first echo request packet, transmitting a first echo reply packet to a further network node that initiated the first echo request packet, wherein the first echo reply packet includes an indication that the FEC is to be replaced by a set of FECs;
 receiving a second echo request packet including a second label stack and a second target FEC stack, wherein the second label stack includes the following: a label corresponding to the BSID, and at least a first FEC from the set of FECs; and
 in response to expiration of a TTL associated with the second echo request packet, transmitting to a downstream network node a third echo request packet based on the second echo request packet, wherein the third echo request packet includes: a third label stack associated with the set of FECs, and a third target FEC stack that includes the first FEC.

2. The method of claim 1, wherein the indication is included in an FEC stack change sub-Type-Length-Value (TLV) in a Downstream Detailed Mapping TLV.

3. The method of claim 1, wherein:
 a TTL value associated with at least one label in the third label stack is configured such that expiration of a TTL associated with the third echo request packet is to occur at a network node to be traced by the third echo request packet; and
 the network node to be traced by the third echo request packet is one of the following: a network node associated with the first FEC, or a network node upstream to the network node associated with the first FEC.

4. The method of claim 3, wherein:
 the second echo request packet includes a value indicating a number of hops from the network node advertising the BSID to the network node to be traced by the third echo request packet, along a Label Switched Path (LSP) represented by the BSID; and
 the TTL value associated with the at least one label in the third label stack is configured based on the value indicating the number of hops.

5. The method of claim 4, wherein the value is carried in a TTL value associated with the BSID in the second label stack.

6. The method of claim 4, wherein the TTL value associated with the at least one label in the third label stack is further configured based on a number of hops from one of the following to the network node associated with the first FEC:
 the network node advertising the BSID; or
 a network node associated with a label that is immediately outer in the label stack relative to the label associated with the first FEC.

7. The method of claim 3, further comprising:
 receiving a third echo reply packet from the network node to be traced by the third echo request packet;
 determining that the third echo reply packet is responsive to the third echo request packet; and
 transmitting to the further network node a second echo reply packet responsive to the second echo request packet, wherein the second echo reply packet is based on the third echo reply packet.

8. The method of claim 7, wherein:
 the second echo request packet contains a first identifier of a traceroute instance initiated by the further network node;
 the third echo request packet contains a second identifier mapped to the first identifier;
 the third echo reply packet is determined to be responsive to the third echo request packet when the third echo reply packet contains an identifier consistent with the second identifier; and
 the second echo reply packet is transmitted with an identifier consistent with the first identifier.

9. The method of claim 7, wherein:
 the second echo request packet includes an Internet Protocol (IP) address of the further network node as a source IP address;
 the third echo request packet includes an IP address of the network node as a source IP address; and
 the second echo reply packet is transmitted using the IP address of the further network node as a destination IP address.

10. A method for initiating a Label Switched Path (LSP) traceroute, the method performed by a network node and comprising:
 receiving, from a second network node, a first echo reply packet responsive to a first echo request packet, wherein the first echo request packet includes:
  a first target Forwarding Equivalence Class (FEC) stack including an FEC associated with a Binding Segment Identifier (BSID) advertised by the second network node; and
  an indication that the FEC is to be replaced by a set of FECs; and
 transmitting a second echo request packet that includes:
  a second target FEC stack based on the set of FECs; and
  a label stack including a label corresponding to the BSID, wherein the label includes a Time To Live (TTL) value associated with the BSID, wherein the TTL value indicates a number of hops from the second network node to a further network node to be traced by the second echo request packet, along an LSP represented by the BSID; and configuring a further TTL value in at least one label that is outer in the label stack relative to the label corresponding to the BSID, such that expiration of the further TTL value is to occur at the second network node that advertises the BSID.

11. The method of claim 10, wherein configuring the further TTL value comprises adding to the label stack an explicit-NULL label associated with a TTL value of 1, wherein the explicit-NULL label is added immediately outer in the label stack relative to the label corresponding to the BSID in the label stack.

12. The method of claim 11, wherein adding the explicit-NULL label is performed in response to determining that each of one or more labels, that are outer in the label stack relative to the label corresponding to the BSID, will have been popped when the second echo request is received by the second network node that advertises the BSID.

13. The method of claim 12, wherein determining that each of the one or more labels will have been popped comprises determining that a label, immediately outer in the label stack relative to the BSID, is associated with an adjacency SID or a Penultimate Hop Popping (PHP) enabled node SID of the second network node advertising the BSID.

14. The method of claim 10, further comprising:
receiving a second echo reply packet responsive to the second echo request packet from the second network node that advertises the BSID; and transmitting a further echo request packet containing a further value that indicates a number of hops from the second network node to a next network node to be traced along the LSP represented by the BSID.

15. A network node comprising:
a communication interface,
a processor, and
a memory storing instructions executable by the processor, whereby the network node is operative to:
receive a first echo request packet containing a first target Forwarding Equivalence Class (FEC) stack that includes an FEC associated with a Binding Segment Identifier (BSID) advertised by the network node;
in response to expiration of a Time To Live (TTL) associated with the first echo request packet, transmit a first echo reply packet to a further network node that initiated the first echo request packet, wherein the first echo reply packet includes an indication that the FEC is to be replaced by a set of FECs;
receive a second echo request packet including a second label stack and a second target FEC stack, wherein the second label stack includes the following: a label corresponding to the BSID, and at least a first FEC from the set of FECs; and
in response to expiration of a TTL associated with the second echo request packet, transmit to a downstream network node a third echo request packet based on the second echo request packet, wherein the third echo request packet includes: a third label stack associated with the set of FECs, and a third target FEC stack that includes the first FEC.

16. A network node comprising:
a communication interface,
a processor, and
a memory storing instructions executable by the processor, whereby the network node is operative to perform operations corresponding to the method of claim 10.

* * * * *